United States Patent [19]
Teske et al.

[11] 3,743,119
[45] July 3, 1973

[54] DEVICE FOR CLEARING FLUENT MATERIAL FROM BUNKER TYPE STORAGE CONTAINERS

[75] Inventors: Fritz Teske; Lothar Teske, both of Porz-Westhoven; Robert Dreismann, Cologne-Niehl, all of Germany

[73] Assignee: Maschinenbau Louise GmbH, Porz-Westhoven, Germany

[22] Filed: Oct. 28, 1970

[21] Appl. No.: 84,573

[52] U.S. Cl. .............. 214/17 DA, 198/126, 198/212
[51] Int. Cl. ............................................. B65g 65/48
[58] Field of Search ..................... 214/17 DA, 17 D, 214/15 E, 17 DC; 198/212, 126, 63; 222/410

[56] References Cited
UNITED STATES PATENTS

| 2,815,134 | 12/1957 | Borrowdale .................... 214/17 DC |
| 3,401,787 | 9/1968 | Vaka .............................. 214/17 DC |

FOREIGN PATENTS OR APPLICATIONS

| 1,316,086 | 12/1962 | France .......................... 214/17 DA |
| 890,626 | 9/1953 | Germany ....................... 214/17 DA |

Primary Examiner—Robert G. Sheridan
Attorney—Lowry, Rinehart, Markva & Smith

[57] ABSTRACT

A device for emptying bunkers and other similar vertical storage containers in which the device includes a horizontally elongated rectangular housing which provides a support for drive wheels to move the device and which also mounts a horizontal clearing wheel for rotation. The device is mounted for horizontal movement in a chamber at the lower end of the bunker. The clearing wheel has a diameter greater than the width of a roof shaped cover within which the carriage is mounted for horizontal movement. This arrangement allows the blade to be engaged by fluent material in the bunker on both sides of the cover. The blade rotates in a plane adjacent horizontal support surfaces at each side of the cover so the fluent material is loosened and moved to fall through a slot onto a conveyor. By virtue of this straight through arrangement, jamming and clogging of the fluent material is avoided, and by virtue of the block shaped or rectangular housing, the manufacturing cost of the device is substantially reduced.

8 Claims, 4 Drawing Figures

PATENTED JUL 3 1973  3,743,119

INVENTOR
FRITZ TESKE, LOTHAR TESKE &
BY ROBERT DREISMANN

Lowry Rinehart, Markva + Smith

DEVICE FOR CLEARING FLUENT MATERIAL FROM BUNKER TYPE STORAGE CONTAINERS

The invention relates to a device for the clearing of bunkers or other bin line storage receptacles by means of bunker emptying carriages, wherein a clearing wheel of the carriage passes along over a table surface supporting bulk material.

The bunker emptying carriages of the type specified have hitherto been so constructed that the emptying carriage is a frame structure on which the necessary operating elements are arranged. The frame is an open frame comprising U-section, H-section or T-section beams or rails. This frame structure comprises, for receiving the driving parts such as motors, transmissions and the like, and also for forming bearings for the shafts at the requisite places, plates which are secured between the beams or rails. Such frame structures are expensive to manufacture because the frame structure must be of good shape-retaining properties and resistant to distortion. In addition the driving elements, which are coupled to one another, must be carefully aligned with one another and must be mounted in a very stable manner so that no displacement occurs during operation which would result in disturbing operations.

The invention has as its object to provide a clearing installation for bunkers containing fluent material wherein in addition to requiring the smallest possible space for the bunker emptying carriage it is possible to obtain the maximum clearing capacity. According to the invention there is provided a bunker emptying carriage which comprises a block-type or box shaped housing accommodating the transmissions for the clearing wheel and the running or drive wheels and also all holders and bearings for these driven parts, and which surrounds and fully encloses the apparatus and parts. The housing is constructed as an elongated block and houses the driving motor for the clearing wheel and the propulsion motor at its ends.

Owing to the block construction developed according to the present invention for bunker emptying carriages, all the components are arranged in a common housing. This housing is at the same time the bearing and frame structure and also encloses all the parts. In this way a satisfactory stable unit is obtained. Protection is also afforded against fouling and dust. The compact construction of a bunker emptying carriage developed according to the invention is, owing to the combination of many components in a single unit, much more advantageous with regard to cost than a construction of an emptying carriage requiring many individual elements, since for each individual element it is always necessary to use similar construction parts such as transmission housings bearings etc. which, in the case of a compact constructional arrangement, are replaced by a common housing.

This kind of block construction for the bunker emptying carriage makes it possible for the bunker emptying carriage to be arranged within a narrow upper roof-shaped cover. The clearing horizontal wheel of the block-construction emptying carriage extends far beyond the sides of the roof-shaped cover. Advantageously the diameter of the clearing wheel is a multiple of the width of the roof-shaped cover for the bunker emptying carriage.

Constructing the bunker emptying installation in this way permits a high-output, straightforward and trouble-free clearing of bulk material from a bunker, independently of how the bunker is constructed. It is not necessary to limit oneself to clearing the material lying on the table surface with a natural slope, and on the contrary the installation of the present invention makes it possible for the clearing wheel to extend to and clear material from precisely the region of the table surface where the column of bulk material, i.e., the quantity of bulk material in a bunker of considerable height, bears directly on the table surface. The arrangement of the present invention for such an installation allows the clearing wheel to engage in the bulk material in a column of this kind which is under pressure. As a result it is always guaranteed that the material will slip down from above as it is removed from the bottom or must slip down, and that the clearing of the bulk material is carried out as intensively as is possible. Very considerable masses can be dealt with. Owing to the narrowness of the block-construction housing of the emptying carriage it is guarteed that the clearing wheel is engaged along its entire radial extent by that mass of a material column exerting a considerable pressure on the table surface. The discharging of the material directly from the pressure column or column of material formed in the bunker automatically ensures that further material can flow down to replace the material removed. There is no need for any additional guide or the like in the bunker.

The invention will be explained hereinafter with reference to the embodiment illustrated in the drawings.

Figure 1:
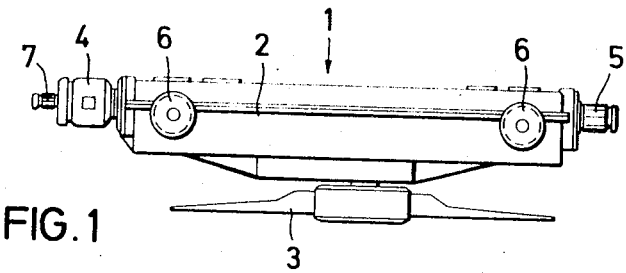
FIG. 1 is a side view in elevation of the bunker emptying carriage of this invention.
Figure 2:
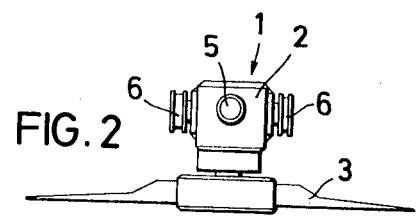
FIG. 2 is a right hand end view of the device of FIG. 1.

The bunker emptying carriage 1 comprises a closed housing 2 within which or on which all the parts necessary for operation are mounted. As is evident from the drawings, the width of the housing 2 is only a fraction of the length of the housing 2. That is, the housing 2 is elongated along its direction of travel. In this specific embodiment, a blade clearing wheel 3 is supported by the housing 2. In addition, there is a drive motor 4 flange connected on one end of the housing 2 and another motor 5 flange connected on the opposite end of the housing 2. Drive wheels 6, of which there are four in this embodiment, are located respectively near the ends of the housing 2 and project transversely from opposite sides thereof. Mounted within the housing 2, is the transmission connecting the drive motor 4 with the blade clearing wheel 3 through a reduction gearing for changing rotational speed of the blade wheel 3. The propulsion transmission for connecting the propulsion motor 5 with the axles of the drive wheels 6 is also mounted in the housing 2. All the supporting bearings and axles for the drive wheels 6 and the blade wheel 3 are mounted within the housing 2. The axles for the drive wheels 6 are mounted independently in the side walls of the housing 2. The propulsion motor 5 drives all the running wheels 6 at the same time. There can also be provided a further smaller motor 7 which serves as an adjusting motor for the variable transmission situated in the interior for changing the rotational speed of the bladed wheel. A variable transmission of this kind can be either hydraulic or mechanical. The individual parts of this variable transmission are mounted directly in the aforesaid transmission.

If a D.C. motor is used for driving the carriage block 2, the adjustment of the rotational speed of the bladed wheel can be effected directly by varying the speed of the motor so that there is no need to mount an adjusting motor on the transmission block.

The bunker emptying carriage of block construction is also a space-saving structure. This makes it possible to use the emptying carriage in many different applications where relatively simple supporting structures are desirable.

Figures 3, 4:
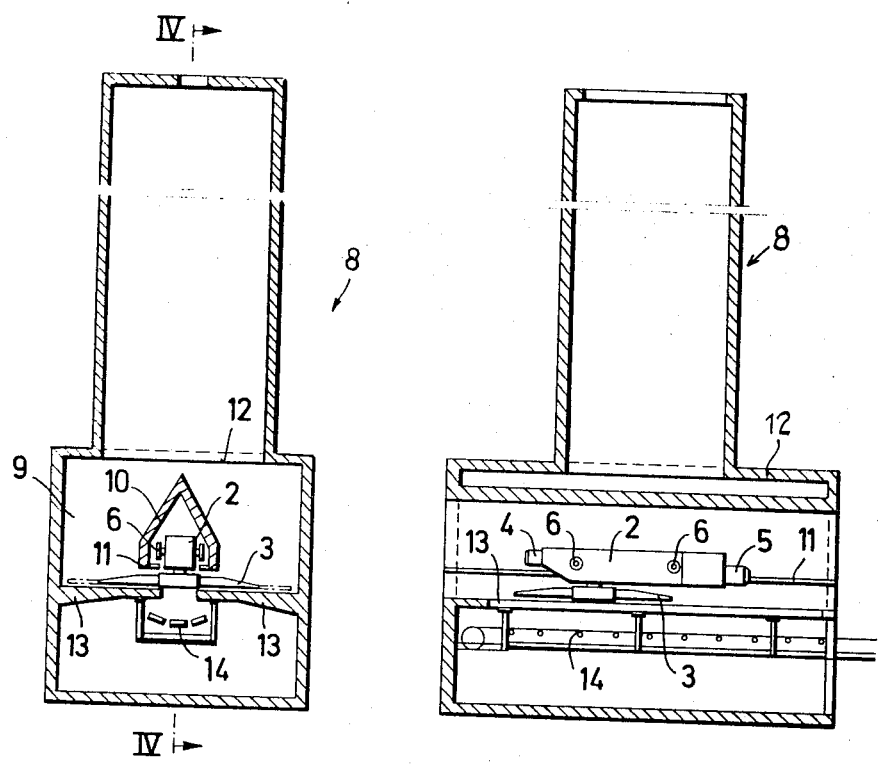
FIG. 3 is a view in vertical section of a bunker installation showing the location of the emptying carriage therein.
FIG. 4 is a view in vertical section taken along the line IV—IV of FIG. 3.

In the bunker construction shown in FIGS. 3 and 4 there is situated in the bunker 8, in the lower discharge chamber 9, a roof-shaped cover 10 within which the block-form emptying carriage 2 is arranged. The running wheels 6 of carriage 2 run on tracks or rails 11. The discharge chamber 9 of the bunker 8 expediently comprises both in the direction of travel of the emptying carriage 2 and transversely thereto a cross-sectional area which is larger than the cross-sectional area of the upper portion of the bunker 8. The roof-shaped cover 10 has its upper edge advantageously spaced below the lower edge 12 of the bunker 8. As a result, the material issuing downwardly from the bunker 8 can flow freely and without hindrance around all sides of the cover.

The clearing wheel of the bunker emptying carriage 2 extends in the radial direction considerably beyond the width of the roof-shaped cover 10. The clearing wheel 3 advantageously fully occupies the width of the discharge chamber 9, the clearing wheel 3 extending over the table surfaces 13 to almost as far as the vertical walls of the discharge chamber 9. The bulk material is delivered through an aperture between the wide tables 13 on to a conveyor 14, e.g., a belt conveyor, trough and chain conveyor, plate conveyor and the like, by the rotating clearing wheel 3. Advantageously the diameter of the clearing wheel 3 amounts to a multiple of the width of the roof-shaped cover 10 i.e., is several times the width of the cover. The pressure of the column of material in the bunker 8, which can be substantial because of its considerable height, e.g., between 10 and 30 m, bears directly on the table surfaces 13. The clearing blades of the clearing wheel 3 pass over said table surfaces. The material can be a lumpy solid, such as coal. The bunkers 8 are preferably of round or polygonal cross-section.

We claim:

1. A carriage device for clearing material from a bunker comprising:
   a. a closed elongated housing having side walls and end walls,
   b. a clearing wheel mounted on said housing for rotation about a vertical axis,
   c. drive walls independently mounted on said side walls for rotation on said housing,
   d. motor means including two motors mounted on opposite end walls on the outside of said housing, and
   e. transmission means including two power transmissions mounted within said elongated housing and adapted to rotate the drive wheels and clearing wheel in response to rotation of said motor means,
   f. said two motors being adapted to separately drive the clearing wheel and drive wheels through their respective transmissions,
   g. whereby the operative parts of the device are accommodated by a common housing,
   h. said device being disposed in a chamber located at the lower end of a bunker,
   i. the diameter of said clearing wheel being only slightly less than the width of said chamber.

2. A carriage device for clearing material from a bunker comprising:
   a. an elongated common housing having side walls and end walls so that it is totally closed on all sides thereof,
   b. a clearing wheel having outwardly extending arms mounted on said housing for rotation about a vertical axis,
   c. drive wheels mounted for rotation on said housing,
   d. motor means mounted on an end wall of said housing,
   e. transmission means mounted within said elongated housing and adapted to rotate the drive wheels and clearing wheel in response to rotation of said motor means whereby the operative parts of the carriage device are protected by the common elongated housing,
   f. said carriage device being disposed in a clearing chamber portion located at the lower end of a bunker portion,
   g. said clearing chamber portion having a cross-sectional area that is greater than the cross-sectional area of the bunker portion and includes spaced-apart support surfaces defining a horizontal slot therebetween,
   h. a covered track is disposed within said clearing chamber portion and extends along said slot in vertically spaced relationship to said slot and support surfaces,
   i. said covered track including a cover portion and spaced-apart rails supported from said cover portion,
   j. said drive wheels of said carriage engage the spaced-apart rails to mount said carriage for horizontal movement in the direction parallel to its elongated side walls above said slot, and
   k. said clearing wheel being rotatably suspended above said support surfaces and having a diameter to project across said support surfaces whereby the material on said support surfaces is moved to said slot when the clearing wheel rotates.

3. A carriage device as defined in claim 2 wherein the cover portion has the shape of a peaked roof structure to direct material from the bunker away from said rails and toward the support surfaces of the chamber.

4. A carriage device as defined in claim 2 wherein the diameter of the clearing wheel is several times the width of the cover portion of the covered track.

5. A storage device comprising:
   a. a vertically disposed bunker portion having a discharge opening at the bottom thereof,
   b. a clearing chamber portion located below and in open connection with the bunker portion,
   c. an emptying carriage having a clearing wheel disposed in the clearing chamber portion and a common housing closed on all sides in which all carriage driving elements are mounted and protected, d. a table surface laterally disposed in the clearing chamber portion and being located in operative relationship with the clearing wheel whereby material stored in the device will be removed from the table surface when the clearing wheel is rotated,
e. a roof-shaped cover being disposed in the clearing chamber portion above the emptying carriage whereby material moving downwardly from the bunker portion will be directed onto the table surface,
f. the table surface having a breadth contacted by the clearing wheel that is larger than the clear width of the bunker discharge opening.

6. A device as defined in claim 5 wherein the table surface includes two oppositely disposed surface portions projecting laterally under the roof-shaped cover to receive the material from the bunker portion.

7. A device as defined in claim 5 wherein the cross-sectional area of the clearing chamber portion is greater than the cross-sectional area of the clearing chamber portion.

8. A device as defined in claim 5 wherein the uppermost portion of the roof-shaped cover is disposed below the lower edge of the bunker discharge opening.

* * * * *